US012788670B2

(12) United States Patent
Abdella et al.

(10) Patent No.: US 12,788,670 B2
(45) Date of Patent: Nov. 10, 2026

(54) BOLSTER VALVE ARRANGEMENT

(71) Applicant: LEAR CORPORATION, Southfield, MI (US)

(72) Inventors: David Abdella, Farmington Hills, MI (US); Samuel Blair, Rochester, MI (US)

(73) Assignee: LEAR CORPORATION, Southfield, MI (US)

(*) Notice: Subject to any disclaimer, the term of this patent is extended or adjusted under 35 U.S.C. 154(b) by 535 days.

(21) Appl. No.: 18/504,462

(22) Filed: Nov. 8, 2023

(65) Prior Publication Data

US 2025/0143952 A1 May 8, 2025

(51) Int. Cl.
*B60N 2/66* (2006.01)
*A61H 9/00* (2006.01)
*B60N 2/90* (2018.01)
*F16K 15/20* (2006.01)

(52) U.S. Cl.
CPC ........... *A61H 9/0078* (2013.01); *B60N 2/665* (2015.04); *B60N 2/914* (2018.02); *F16K 15/202* (2013.01); *A61H 2201/1602* (2013.01); *A61H 2201/5056* (2013.01)

(58) Field of Classification Search
CPC ................................ B60N 2/665; B60N 2/914
See application file for complete search history.

(56) References Cited

U.S. PATENT DOCUMENTS 6,203,105 B1 * 3/2001 Rhodes, Jr. ............ B60N 2/806 297/284.6
7,332,069 B2 2/2008 Edmondson
9,283,875 B1 * 3/2016 Pellettiere .......... B60N 2/42727
9,896,003 B2 * 2/2018 Tamura ................ B60N 2/2222
10,214,129 B2 2/2019 Jaranson et al.
10,315,547 B2 * 6/2019 Shibata .................. B60N 2/914
10,363,852 B2 * 7/2019 Strumolo ................. B60N 2/99
10,479,225 B2 * 11/2019 Dry .......................... B60N 2/22
10,906,442 B2 * 2/2021 Klein ..................... A61H 9/005
11,117,505 B2 * 9/2021 Golles .................. B60N 2/0244
11,590,867 B2 2/2023 Zhang
2010/0289302 A1 * 11/2010 Cheng .................... B60N 2/002 700/282
2014/0232155 A1 8/2014 Bocsanyi
2019/0126799 A1 5/2019 Lem et al.
2022/0170451 A1 6/2022 Suo
2025/0153620 A1 * 5/2025 Kasperczyk ........... B60N 2/976
2025/0368114 A1 * 12/2025 Abdella ................. B60N 2/914

FOREIGN PATENT DOCUMENTS

DE 102016114756 A1 * 2/2017 ............... B60N 2/36
DE 102017129451 A1 * 6/2018 ........... B60N 2/0273
WO WO-2026006676 A1 * 1/2026 ........... B60H 3/0035

* cited by examiner

*Primary Examiner* — Timothy J Brindley
(74) *Attorney, Agent, or Firm* — Carlson, Gaskey & Olds, P.C.

(57) ABSTRACT

A method and apparatus includes a plurality of fluid bladders comprising at least a first fluid bladder and a second fluid bladder, and an actuator that is fluidly connected to the plurality of fluid bladders. The actuator selectively inflates the first fluid bladder and the second fluid bladder. A buffer bladder is fluidly connected to the first fluid bladder and the second fluid bladder via a plurality of one-way valves. A vent is fluidly connected to the plurality of fluid bladders, wherein the vent selectively deflates the first fluid bladder and the second fluid bladder.

20 Claims, 4 Drawing Sheets

BOLSTER VALVE ARRANGEMENT

BACKGROUND

Seats may include lumbar/bolster valves and massage valves that are configured in a valve arrangement. The valves inflate or deflate associated fluid bladders in the seat. If bolsters share an air line, when one bladder is pressed during a cornering maneuver, the support in that bladder is lost as air will simply move to another bladder. Bolsters having separate air lines can maintain firm support when cornering; however, this results in increased cost for an associated pneumatic support system.

DETAILED DESCRIPTION

Figure 1:
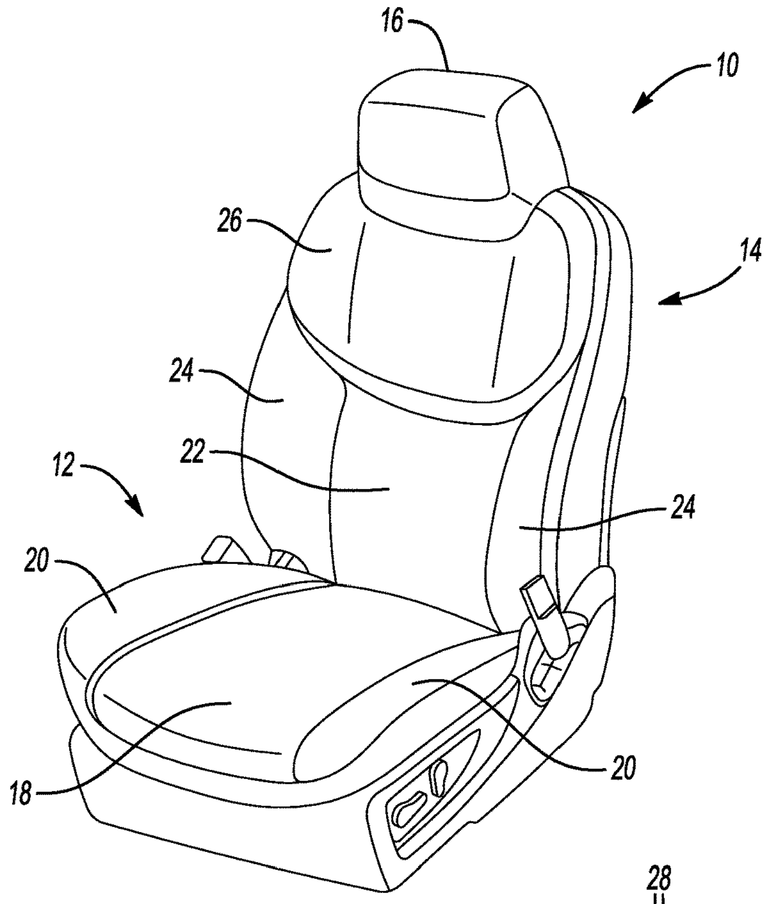
FIG. 1 is a perspective view of an example seat.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates to a pneumatic support system that uses one active valve to supply fluid to inflate multiple fluid bladders in combination with a plurality of one-way passive valves cooperating with each other to fill/hold a set inflation pressure within the bladders, and the multiple fluid bladders are then deflated via one common active vent valve.

FIG. 1 illustrates a seat assembly 10 according to one example embodiment. The seat assembly 10 may be utilized as a vehicle seat assembly 10 for seating in a vehicle, such as an automobile, an aircraft, a watercraft, or any other seating environment. The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for pivotal adjustment relative to the seat bottom 12. A head restraint 16 may also be mounted to the seat back 14.

The seat bottom 12 includes a central seating surface 18 and a pair of side bolster regions 20 laterally spaced about the central seating surface 18. The seat back 14 includes a pelvic/lumbar seating surface 22 with a pair of laterally spaced apart side bolster regions 24 on either side. A thoracic/shoulder seating surface 26 is provided above the pelvic/lumbar seating surface 22 and the seating surface of seat back side bolster regions 24. It should be understood that this is just one example of a seat configuration, and that other configurations could also be utilized.

Figure 2:
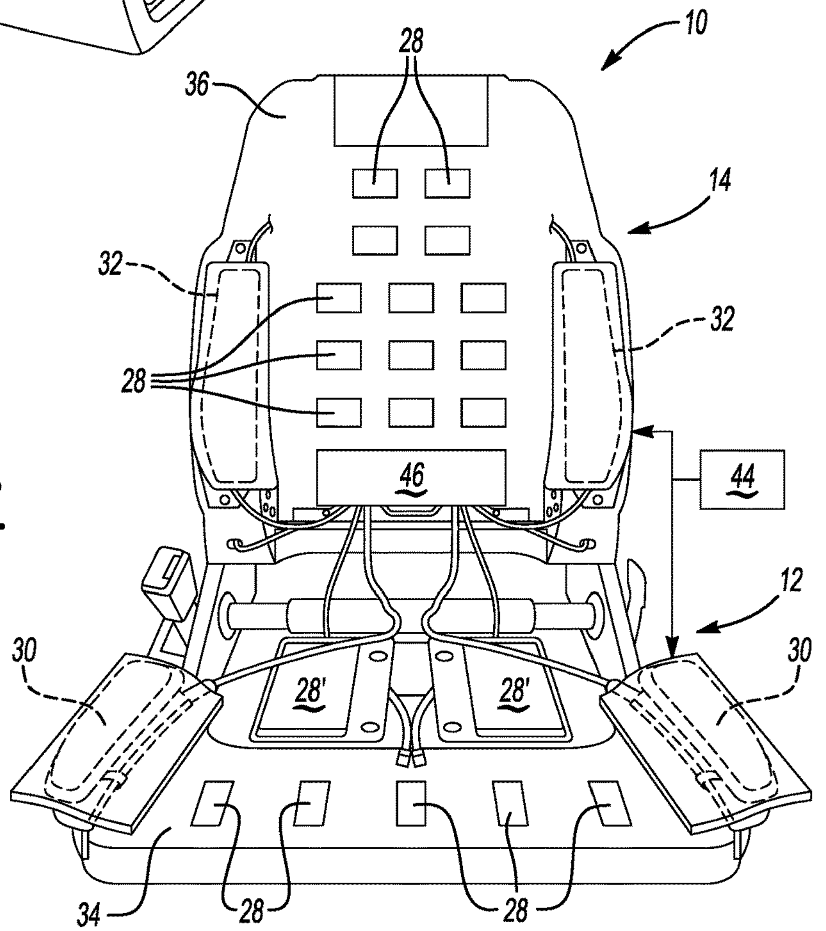
FIG. 2 schematically illustrates some components of a fluid supply system relative to a plurality of fluid bladders.

FIG. 2 illustrates the seat assembly 10 with a cover, trim, and foam removed for revealing underlying components. The seat bottom 12 includes one or more fluid bladder assemblies 28 under the central seating surface 18 and in the seat back 14. The seat bottom 12 also includes a pair of lower side bolster fluid bladder assemblies 30, each located in the seat bottom 12 adjacent the side bolster seating surface 20. Likewise, the seat back 14 includes a pair of upper side bolster fluid bladder assemblies 32, each located adjacent one of the seat back side bolster seating surfaces 24. Each of the side bolster fluid bladder assemblies 30, 32 is supported upon a frame 34, 36 of the corresponding seat bottom 12 and seat back 14.

The side bolster fluid bladder assemblies 30, 32 provide lateral support to a seated occupant when the vehicle experiences a turn or cornering. The fluid bladder assemblies 28 in the seat bottom 12 and in the seat back 14 can be used for lumbar or massage purposes.

The seat assembly 10 also includes an actuator assembly 44 for controlling inflation of the bladder assemblies 28, 30, 32. The actuator assembly 44 may include a compressor or pneumatic pump connected to a valve bank to provide a source of fluid to the fluid bladder assemblies 28, 30, 32. A seat control module is provided in the seat bottom 12 or seat back 14 and is identified generally as a controller 46. In one example, the controller 46 regulates compressed air into and out of the bladder assemblies 28, 30, 32 in the seat assembly 10. The controller 46 and actuator 44 may be installed in the seat back 14, as shown, or installed under the seat, or anywhere suitable in the vehicle. Further, the controller 46 and actuator 44 may be separate units or may be combined together as a single unit.

The controller 46 may include a processing unit and non-transitory memory for executing various control strategies. The processing unit can be a custom made or commercially available processor, a central processing unit (CPU), or generally any device for executing software instructions. The memory can include any one or combination of volatile memory elements and/or nonvolatile memory elements. The processing unit can be programmed to execute one or more programs stored in the memory. The programs may be stored in the memory as software code, for example. The programs stored in the memory may include one or more additional or separate programs, each of which includes an ordered list of executable instructions for implementing logical functions associated with controlling the valve bank. While shown as a single controller, the controller 46 may be comprised of one or more controllers. The controller 46 may also be in communication with, and responsive to instructions from, another controller.

Figure 3:
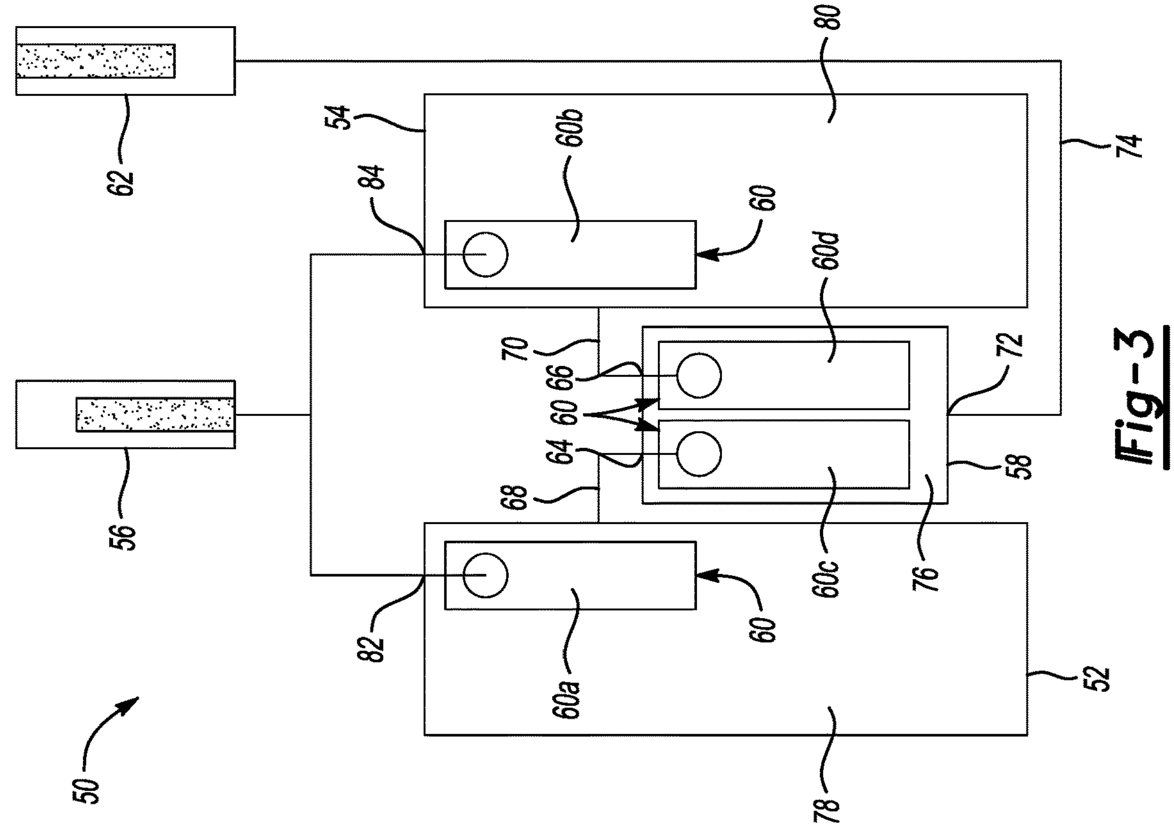
FIG. 3 is a schematic view of a valve arrangement for multiple bladders.

FIG. 3 shows one example of a pneumatic support system 50 that includes a plurality of fluid bladders that comprises at least a first fluid bladder 52 and a second fluid bladder 54. Each fluid bladder 52, 54 comprises a pneumatic cell or pouch that is expandable to provide increased support in a desired area on the seat 10. In one example, these bladders 52, 54 can be used as bladders 30, 32 as shown in FIG. 2. An actuator 56, which is associated with the actuator assembly 44 and controller 46, is fluidly connected to the first 52 and second 54 fluid bladders. In one example, the actuator 56 comprises an active inflation valve that selectively inflates the first fluid bladder 52 and the second fluid bladder 54. The pneumatic support system 50 further includes a buffer bladder 58 that is fluidly connected to the first fluid bladder 52 and the second fluid bladder 54 via a plurality of one-way passive valves 60. In one example, the buffer bladder 58 comprises a pneumatic cell or pouch that fluidly connects adjacent pairs of fluid bladders to each other. In one example, the one-way passive valves 60 comprise Thermoplastic Polyurethane (TPU) valves or other types of one-way passive valves. The pneumatic support system 50 also includes a vent 62 that is fluidly connected to the plurality of fluid bladders, wherein the vent 62 selectively deflates the first fluid bladder 52 and the second fluid bladder 54. In one example, the vent 62 comprises an active deflation valve. The active inflation and deflation valves are selectively controlled via the controller 46.

In one example, each pair of fluid bladders 52, 54 is associated with a common buffer bladder 58 to maintain the bladder pressure in each bladder of the pair of bladders at a desired pressure. As such, each pair of fluid bladders 52, 54 in the plurality of fluid bladders is associated with only one buffer bladder 58.

In one example, the buffer bladder 58 is smaller in size than each associated pair of fluid bladders. Thus, for example, the buffer bladder 58 shown in FIG. 3 is smaller in size than the first fluid bladder 52 and the second fluid bladder 54. In one example, the buffer bladder is significantly smaller in size such that the buffer bladder pouch encloses a smaller volumetric space than the volumetric space enclosed by the pouches of the first 52 and second 54 fluid bladders. In one example, the buffer bladder 58 is less than half the size of the associated pair of fluid bladders.

The buffer bladder 58 is configured to have multiple inlets, e.g. one inlet for each associated fluid bladder, and a single outlet to the vent 62. Thus, as shown in FIG. 3, the buffer bladder 58 has a first inlet 64 associated with the first fluid bladder 52 and a second inlet 66 associated with the second fluid bladder 54. Thus, there is one fluid communication path 68 from first fluid bladder 52 to the buffer bladder 58, and there is one fluid communication path 70 from second fluid bladder 54 to the buffer bladder 58. Further, the buffer bladder 58 includes a single outlet 72 to the vent 62 such that there is one fluid communication path 74 from an internal fluid cavity 76 of the buffer bladder 58 to a flow communication line associated with the vent 62.

In one example, each fluid bladder of the pneumatic support system 50 includes a single one-way valve and each buffer bladder includes two one-way valves. As such, the plurality of one-way valves 60 includes at least a first one-way valve 60*a* associated with the first fluid bladder 52, a second one-way valve 60*b* associated with the second fluid bladder 54, a third one-way valve 60*c* associated with the buffer bladder 58, and a fourth one-way valve 60*d* associated with the buffer bladder 58. Each of the one-way valves 60*a-d* comprises a TPU valve or other similar passive valve that is at least partially received within a fluid chamber 78, 80 of the associated bladder 52, 54 and allows only one way flow through the valve 60*a-d*.

In the disclosed configuration, each fluid bladder has a single inlet associated with the one-way valve and a single outlet associated with one of the two one-way valves in the buffer bladder. For example, the first fluid bladder 52 has a single inlet 82 via the first one-way valve 60*a* for inflation of the first fluid bladder 52, and the second fluid bladder 54 has a single inlet 84 via the second one-way valve 60*b* for inflation of the second fluid bladder 54. The buffer bladder 58 has a first inlet 64 via the third one-way valve 60*c* and a second inlet 66 via the fourth one-way valve 60*d*. Thus, there is a single and uninterrupted flow communication path 68 from internal cavity 78 of the first fluid bladder 52 to the third one-way valve 60*c* of the buffer bladder, and a single and uninterrupted flow communication path 70 from internal cavity 80 of the second fluid bladder 54 to the fourth one-way valve 60*d* of the buffer bladder.

The inflate/deflate operation for the pneumatic support system 50 is accomplished by using one active inflate valve 56 per pair of bladders 52, 54, the plurality of one-way valves 60, the buffer bladder 58, and one active vent valve 62 per pair of bladders 52, 54. In one example, the actuator 56 comprises an active inflate valve 56 that is a two port valve associated with a controller 46 that selectively turns the flow on or off for inflation. In one example, the vent 62 comprises an active vent valve 62 that is a two port valve associated with a controller 46 that selectively turns the flow on or off for deflation. The active inflate valve 56 and the active vent valve 62 are selectively controlled by the controller 46 to provide a desired bolster pressure in the associated bladders.

In one example, an inflation state for the pneumatic support system 50 comprises the active inflate valve 56 being open, e.g. flow on for inflation, and the active vent valve 62 being closed, e.g. flow off, such that the first fluid bladder 52 and the second fluid bladder 54 are respectively filled through the first one-way valve 60*a* and the second one-way valve 60*b*. Flow from the first fluid bladder 52 enters the third one-way valve 60*c* in the buffer bladder 58 and flow from the second fluid bladder 54 enters the fourth one-way valve 60*d* to fill the buffer bladder 58 until the first fluid bladder 52, second fluid bladder 54, and buffer bladder 58 all reach a set inflation pressure, e.g. all bladders 52, 54, 58 achieve a common pressure. In accordance with a determination that the set inflation pressure is reached, the active inflate valve 56 is then closed. e.g. flow off condition.

In one example, a deflation state for the pneumatic support system 50 comprises the active inflate valve 56 being closed, e.g. flow off condition, and the active vent valve 62 is opened, e.g. flow out for deflation, such that all fluid flows out of the first fluid bladder 52, second fluid bladder 54, and buffer bladder 58 via the active vent valve 62, e.g., all bladders 52, 54, 58 are exhausted.

In one example, the actuator 56 comprises one single active inflation valve 56 that fills all bladders of the plurality of fluid bladders. Thus, while the active inflation valve 56 is shown as being fluidly coupled to two fluid bladders 52, 54 in FIG. 3, the active inflation valve 56 could be fluidly coupled to additional fluid bladders for inflation purposes. As discussed above, the active inflation valve 56 comprises a two port valve that is selectively actuated by the controller 46 for a flow on condition, e.g. open/inflate position, or a flow off condition, e.g. closed position for holding pressure or closed for selective deflation.

In one example, the vent 62 comprises one single vent active deflation valve 62 that deflates all bladders of the plurality of bladders. Thus, while the active deflation valve 62 is shown as being fluidly coupled to two fluid bladders 52, 54 in FIG. 3, the active deflation valve 62 could be fluidly coupled to additional fluid bladders for venting purposes. As discussed above, the active deflation valve 62 comprises a two port valve that is selectively actuated by the controller 46 for a flow on condition, e.g. open/deflate position, or a flow off condition, e.g. closed position for holding pressure or closed for selective inflation.

In one example, the fluid bladders 52, 54 comprise lumbar and/or bolster bladders that are configured to maintain a set pressure within each fluid bladder. The fluid bladders are configured as individual inflatable air cells or pouches capable of holding an internal pressure that can be adjusted to provide various support settings. The fluid bladders are actively and selectively filled with fluid, such as air for example, until all fluid bladders reach a common pressure.

Figure 4B:
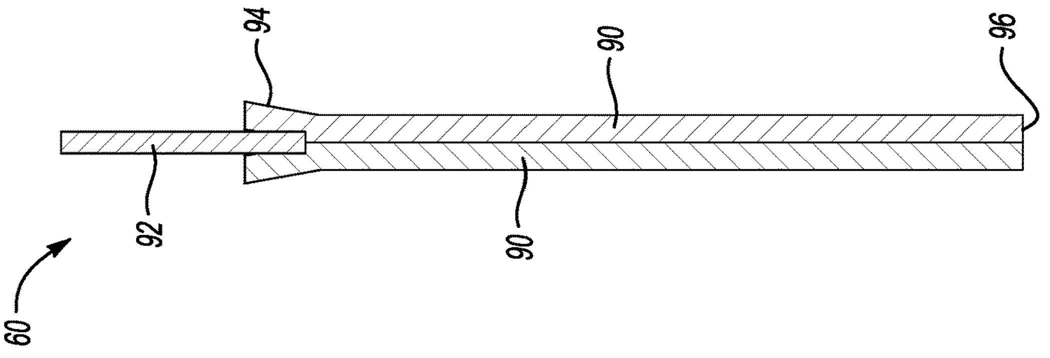
FIG. 4B is a side view of the passive valve of FIG. 4A.
Figure 4A:
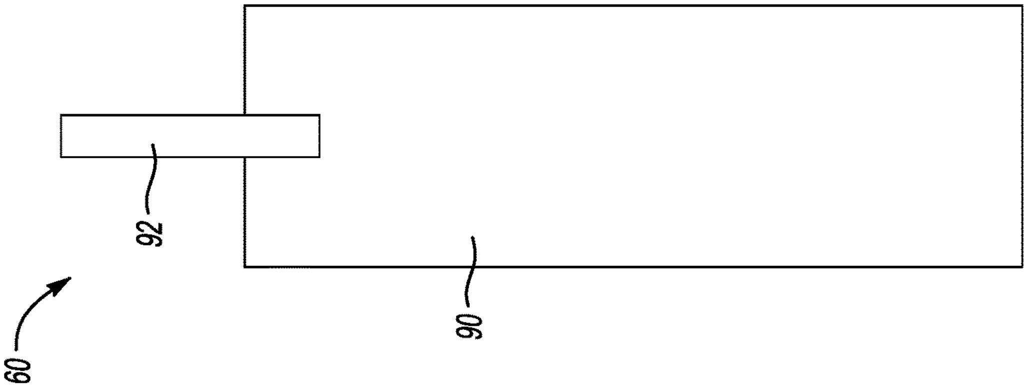
FIG. 4A is schematic view of one example of a passive valve as used in the arrangement of FIG. 3.
Figure 5A:
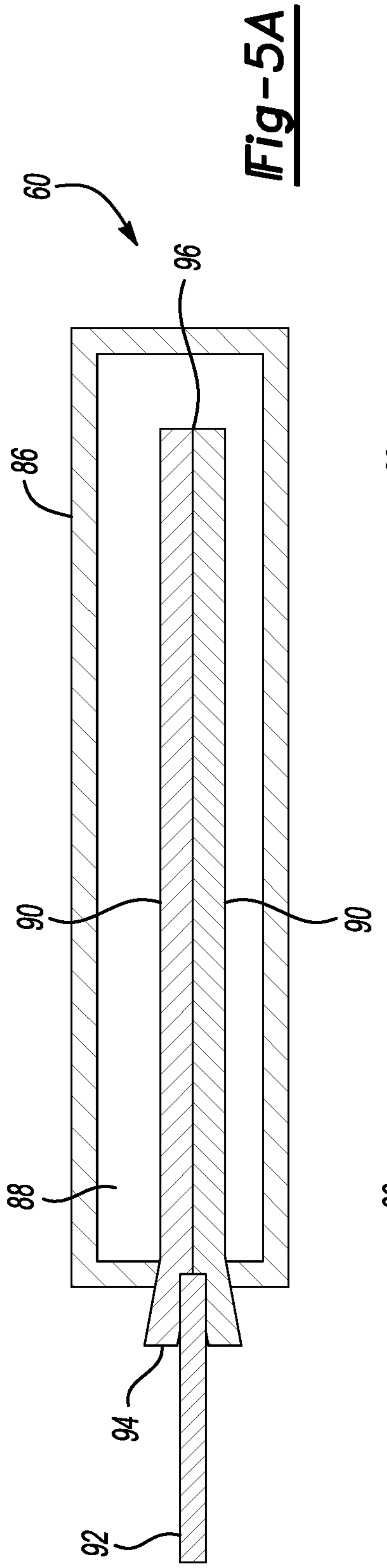
FIG. 5A is a schematic view of the passive valve of FIG. 4A in an initial state.
Figure 5B:
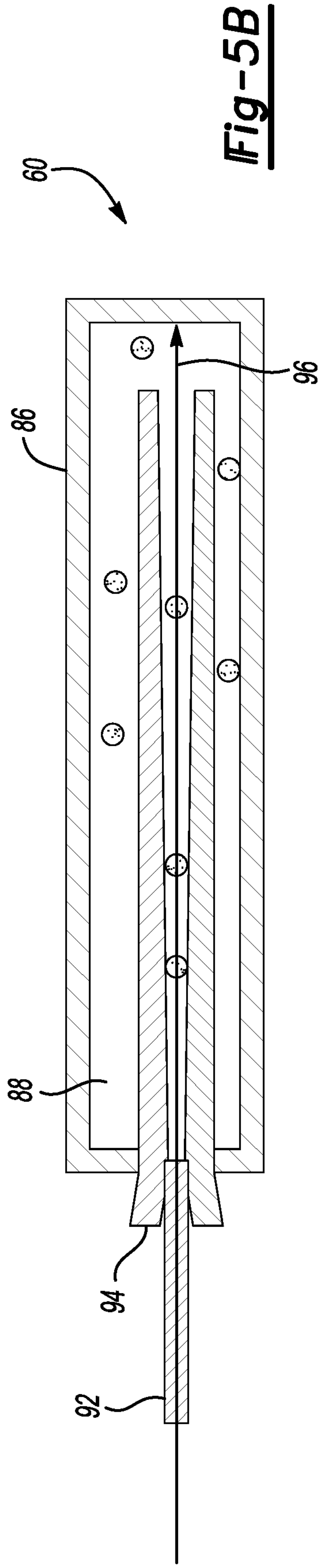
FIG. 5B is a schematic view of the passive valve of FIG. 5A during inflation.
Figure 5C:
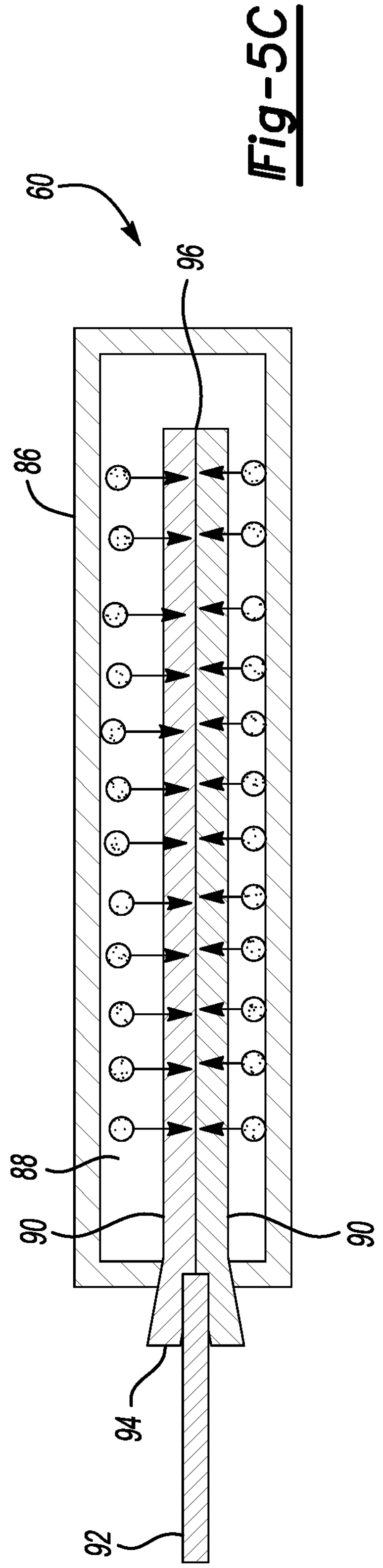
FIG. 5C is a schematic view of the passive valve of FIG. 5A in an inflated and closed state.

FIGS. 4A-B and 5A-C show one example of a passive one-way valve 60. In this example, the passive one-way valve 60 comprises a TPU valve that is located at least partially within a fluid chamber of one of the first fluid bladder 52, second fluid bladder 54, and buffer bladder 58. As shown in FIGS. 5A-C, the one-way passive valve 60 is positioned within an associated fluid bladder 86 that encloses a fill chamber 88. As shown in FIG. 4A-B, the valve 60 comprises two flaps 90 that overlap each other in an initial state as shown in FIG. 5A. A fill member 92 is inserted between the flaps 90 at an inlet end 94. In one example, the flaps 90 comprise discrete flat sheets of material that are moveable toward and away from each other. The fill member 92 comprises a tube or other similar structure that is fluidly connected to a fluid supply. The flaps 90 separate from each other within the fluid chamber 88 during inflation, as shown in FIG. 5B, to allow fluid to exit an outlet end 96 of the flaps 90 to fill the chamber 88. Inflation occurs until pressure within the fluid chamber 88 external to the two flaps 90 reaches a pressure level that forces the two flaps together to prevent any backflow as shown in FIG. 5C. Once the set inflation pressure is reached within the fluid bladder 86, the pressure is held until the active deflate valve 62 is selectively actuated by the controller 46.

Figure 6:
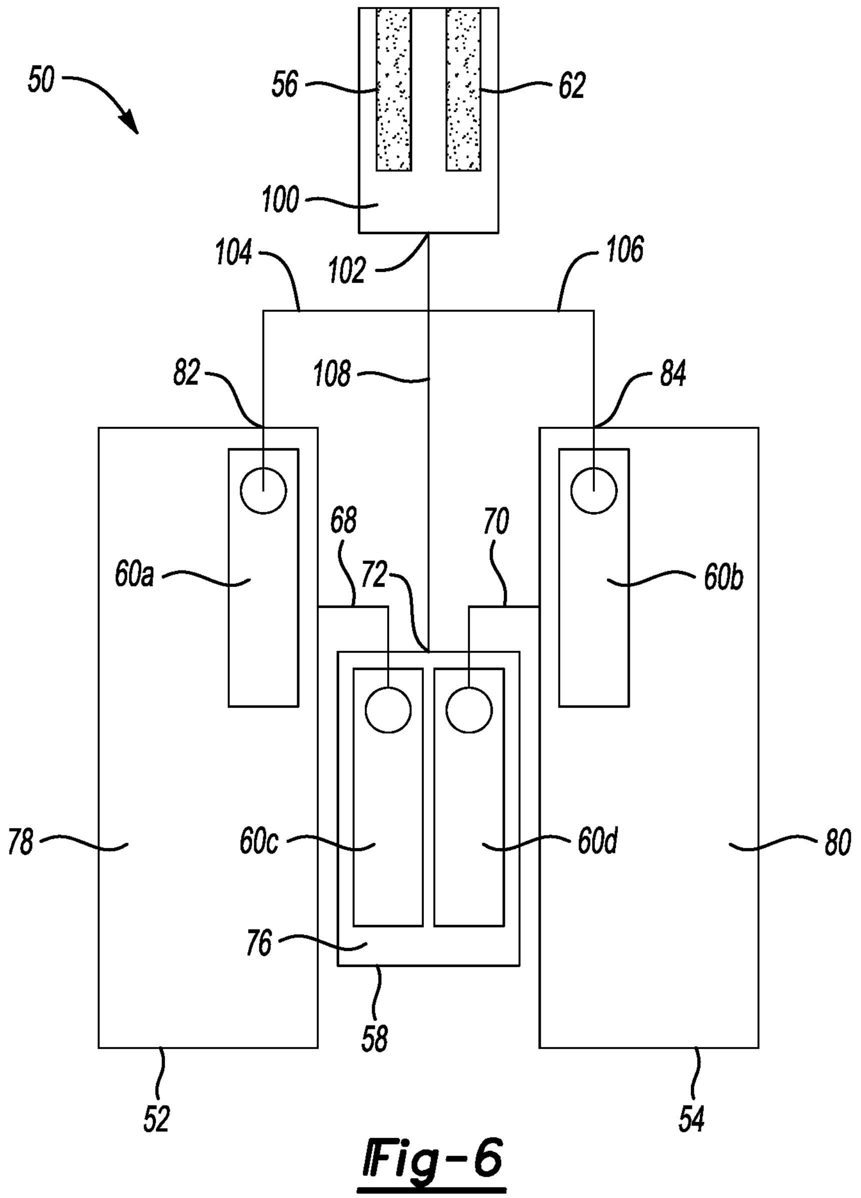
FIG. 6 is a schematic view of another valve arrangement for multiple bladders.

Another example of a valve arrangement is shown in FIG. 6. In this example, the fill/active inflation valve 56 and the vent/active deflation valve 62 share common fluid connection lines and a common valve chamber which is fluidly connected to the bladders 52, 54. As shown, a single fluid chamber 100 includes both the fill/active inflation valve 56 and the vent/active deflation valve 62. The chamber 100 has a single outlet/inlet 102 that connects to a first supply line 104 to supply fluid to the inlet 82 to the first bladder 52 and connects to a second supply line 106 to supply fluid to the inlet 84 to the second bladder 54. The single outlet 72 from the buffer bladder 58 connects to a fluid connection line 108 that feeds into the outlet/inlet 102 associated with the fluid chamber 100. In this configuration, the chamber 100 is always fluidly connected to the lines/bladders, and the valves 56, 62 move to open the associated line to the pump pressure or the vent/atmosphere. This provides a more compact design with less line length. During cornering maneuvers, the pressure within the bladders 52, 54, 58 is maintained without being transferred/shifted from one bladder to another. This maintains a firm and desired comfort level for seat occupants during all movements of the vehicle. Further, the use of one-way passive valves in combination with one active inflate valve and one active deflate valve for multiple bladders reduces overall cost compared to having active valves for each bladder.

Also disclosed is a method of supplying fluid to inflate multiple fluid bladders via a common actuator, with a buffer bladder and a plurality of one-way passive valves cooperating with each other to fill/hold a set inflation pressure, and with subsequent deflation of the multiple fluid bladders via one common active vent valve. In one example, the method comprises providing a plurality of fluid bladders including at least a first fluid bladder and a second fluid bladder, fluidly connecting a buffer bladder with the first fluid bladder and the second fluid bladder via a plurality of one-way valves, selectively inflating the first fluid bladder and the second fluid bladder with a common actuator, and selectively deflating the first fluid bladder and the second fluid bladder with a common vent.

The method may include any of the following steps in any combination. The method may include associating each pair of fluid bladders in the plurality of fluid bladders with one buffer bladder.

The method may include forming the buffer bladder to have a smaller size than the first fluid bladder and the second fluid bladder.

The method may include providing the buffer bladder with a first inlet associated with the first fluid bladder and a second inlet associated with the second fluid bladder, and providing the buffer bladder with a single outlet to the vent. The method may include: associating at least a first one-way valve with the first fluid bladder; associating a second one-way valve with the second fluid bladder; associating a third one-way valve with the buffer bladder; and associating a fourth one-way valve with the buffer bladder.

The method may include inflating the first fluid bladder through a single inlet with the first one-way valve; inflating the second fluid bladder through a single inlet with the second one-way valve; inflating the buffer bladder through a first inlet with the third one-way valve; and inflating the buffer bladder through a second inlet with the fourth one-way valve.

The method may include providing the actuator as an active inflate valve and the vent as an active vent valve, and the method may further include: inflating the first fluid bladder and second fluid bladder by opening the active inflate valve and closing the active vent valve such that the first fluid bladder and the second fluid bladder are respectively filled through the first one-way valve and the second one-way valve; inflating the buffer bladder with flow from an outlet of the first fluid bladder that is directed into the third one-way valve and with flow from an outlet of the second fluid bladder that is directed into the fourth one-way valve until the first fluid bladder, second fluid bladder, and buffer bladder all reach a set inflation pressure; in accordance with a determination that the set inflation pressure is reached, closing the active inflate valve; and deflating the first fluid bladder, second fluid bladder, and buffer bladder by closing the active inflate valve and opening the active vent valve such that all fluid flows out of the first fluid bladder, second fluid bladder, and buffer bladder via the active vent valve.

The method may include providing the actuator as a single active inflation valve that fills all bladders of the plurality of fluid bladders, and the vent as a single vent valve that deflates all bladders of the plurality of fluid bladders.

The method may include providing the plurality of fluid bladders as lumbar or bolster bladders and including actively and selectively filling the plurality of fluid bladders with fluid until all fluid bladders reach a set inflation pressure.

The method may include locating each of the plurality of one-way valves of one of the first fluid bladder, second fluid bladder, and buffer bladder; and providing each one-way valve with two flaps that separate from each other within the fluid chamber during inflation until a set inflation pressure is reached.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An apparatus comprising:

a plurality of fluid bladders including at least a first fluid bladder and a second fluid bladder;

an actuator fluidly connected to the plurality of fluid bladders, wherein the actuator selectively inflates the first fluid bladder and the second fluid bladder;

a buffer bladder fluidly connected to the first fluid bladder and the second fluid bladder via a plurality of one-way valves; and a vent fluidly connected to the plurality of fluid bladders, wherein the vent selectively deflates the first fluid bladder and the second fluid bladder.

2. The apparatus of claim 1, wherein each pair of fluid bladders in the plurality of fluid bladders is associated with one buffer bladder.

3. The apparatus of claim 1, wherein the buffer bladder is smaller in size than the first fluid bladder and the second fluid bladder.

4. The apparatus of claim 1, wherein the buffer bladder has a first inlet associated with the first fluid bladder and a second inlet associated with the second fluid bladder, and wherein the buffer bladder includes a single outlet to the vent.

5. The apparatus of claim 1, wherein the plurality of one-way valves includes at least a first one-way valve associated with the first fluid bladder, a second one-way valve associated with the second fluid bladder, a third one-way valve associated with the buffer bladder, and a fourth one-way valve associated with the buffer bladder.

6. The apparatus of claim 5, wherein:

the first fluid bladder has a single inlet via the first one-way valve;

the second fluid bladder has a single inlet via the second one-way valve;

the buffer bladder has a first inlet via the third one-way valve; and the buffer bladder has a second inlet via the fourth one-way valve.

7. The apparatus of claim 6, wherein the actuator comprises an active inflate valve and the vent comprises an active vent valve, the active inflate valve and the active vent valve selectively controlled with a controller, wherein:

an inflation state comprises the active inflate valve being open and the active vent valve being closed such that the first fluid bladder and the second fluid bladder are respectively filled through the first one-way valve and the second one-way valve, and wherein flow from the first fluid bladder enters the third one-way valve to fill the buffer bladder and flow from the second fluid bladder enters the fourth one-way valve to fill the buffer bladder until the first fluid bladder, second fluid bladder, and buffer bladder all reach a set inflation pressure, and in accordance with a determination that the set inflation pressure is reached, the active inflate valve is closed; and a deflation state comprises the active inflate valve being closed and the active vent valve being opened such that all fluid flows out of the first fluid bladder, second fluid bladder, and buffer bladder via the active vent valve.

8. The apparatus of claim 1, wherein the actuator comprises a single active inflation valve that fills all bladders of the plurality of fluid bladders.

9. The apparatus of claim 1, wherein the vent comprises a single vent valve that deflates all bladders of the plurality of fluid bladders.

10. The apparatus of claim 1, wherein the plurality of fluid bladders comprises lumbar or bolster bladders and wherein the plurality of fluid bladders are actively and selectively filled with fluid until all fluid bladders reach a set inflation pressure.

11. The apparatus of claim 1, wherein each of the plurality of one-way valves is located at least partially within a fluid chamber of one of the first fluid bladder, second fluid bladder, and buffer bladder, and where each one-way valve comprises two flaps that separate from each other within the fluid chamber during inflation until a set inflation pressure is reached.

12. A method comprising:

providing a plurality of fluid bladders including at least a first fluid bladder and a second fluid bladder;

fluidly connecting a buffer bladder with the first fluid bladder and the second fluid bladder via a plurality of one-way valves;

selectively inflating the first fluid bladder and the second fluid bladder with a common actuator; and selectively deflating the first fluid bladder and the second fluid bladder with a common vent.

13. The method of claim 12, including associating each pair of fluid bladders in the plurality of fluid bladders with one buffer bladder.

14. The method of claim 12, including forming the buffer bladder to have a smaller size than the first fluid bladder and the second fluid bladder.

15. The method of claim 12, wherein the buffer bladder has a first inlet associated with the first fluid bladder and a second inlet associated with the second fluid bladder, and wherein the buffer bladder includes a single outlet to the common vent; and including:

associating at least a first one-way valve with the first fluid bladder;

associating a second one-way valve with the second fluid bladder;

associating a third one-way valve with the buffer bladder; and associating a fourth one-way valve with the buffer bladder.

16. The method of claim 15, including:

inflating the first fluid bladder through a single inlet with the first one-way valve;

inflating the second fluid bladder through a single inlet with the second one-way valve;

inflating the buffer bladder through a first inlet with the third one-way valve; and inflating the buffer bladder through a second inlet with the fourth one-way valve.

17. The method of claim 16, wherein the common actuator comprises an active inflate valve and the common vent comprises an active vent valve, and including:

inflating the first fluid bladder and second fluid bladder by opening the active inflate valve and closing the active vent valve such that the first fluid bladder and the second fluid bladder are respectively filled through the first one-way valve and the second one-way valve;

inflating the buffer bladder with flow from an outlet of the first fluid bladder that is directed into the third one-way valve and with flow from an outlet of the second fluid bladder that is directed into the fourth one-way valve until the first fluid bladder, second fluid bladder, and buffer bladder all reach a set inflation pressure;

in accordance with a determination that the set inflation pressure is reached, closing the active inflate valve; and deflating the first fluid bladder, second fluid bladder, and buffer bladder by closing the active inflate valve and opening the active vent valve such that all fluid flows out of the first fluid bladder, second fluid bladder, and buffer bladder via the active vent valve.

18. The method of claim 12, wherein the common actuator comprises a single active inflation valve that fills all bladders of the plurality of fluid bladders, and wherein the common vent comprises a single vent valve that deflates all bladders of the plurality of fluid bladders.

19. The method of claim 12, wherein the plurality of fluid bladders comprises lumbar or bolster bladders and including actively and selectively filling the plurality of fluid bladders with fluid until all fluid bladders reach a set inflation pressure.

20. The method of claim 12, including:

locating each of the plurality of one-way valves at least partially within a fluid chamber of one of the first fluid bladder, second fluid bladder, and buffer bladder; and providing each one-way valve with two flaps that separate from each other within the fluid chamber during inflation until a set inflation pressure is reached.

* * * * *